United States Patent [19]

Krueger

[11] 4,223,575

[45] Sep. 23, 1980

[54] REACTOR VESSEL STUD TURNOUT TOOL

[75] Inventor: William H. Krueger, Pittsburgh, Pa.

[73] Assignee: Westinghouse Electric Corp., Pittsburgh, Pa.

[21] Appl. No.: 853,368

[22] Filed: Nov. 21, 1977

[51] Int. Cl.$^2$ .............................................. G21C 13/06
[52] U.S. Cl. .................................. 81/57.38; 176/30; 176/87; 403/16; 81/57.3
[58] Field of Search .................. 176/87, 30; 81/57.38, 81/57.3, 57.29, 57.25; 403/16; 294/86 A

[56] References Cited

U.S. PATENT DOCUMENTS

| | | | |
|---|---|---|---|
| 3,844,533 | 10/1974 | Markiewicz | 81/57.38 |
| 4,047,456 | 9/1977 | Scholz | 81/57.38 |

*Primary Examiner*—Stephen C. Bentley
*Assistant Examiner*—Edward F. Miles
*Attorney, Agent, or Firm*—L. A. DePaul; Z. L. Dermer

[57] ABSTRACT

Apparatus for removing or inserting studs of a nuclear reactor vessel closure head so that the closure head may be removed for refueling the nuclear reactor. The apparatus comprises a carriage having an engagement mechanism for firmly contacting the studs and a rotation mechanism for rotating the engagement mechanism. A drive mechanism is also attached to the carriage for rotating the rotation mechanism. In addition, a support device is associated with the carriage that is capable of supporting the weight of the carriage during transit and of supporting the weight of the stud while the stud is being manipulated.

9 Claims, 7 Drawing Figures

Referring now to FIGS. 2, 3, and 4 the stud turnout tool is referred to generally as 34 which is used to remove or insert studs 22 from first bore 20 and second bore 30. Tool 34 comprises an engagement mechanism 36 for engaging caps 24 of studs 22, rotation mechanism 38 for rotating engagement mechanism 36, and drive mechanism 40 for driving rotation mechanism 38. Tool 34 also comprises a carriage 42 and a support device 44 for supporting the carriage 42 and the weight of studs 22.

Still referring to FIGS. 2, 3, and 4, carriage 42 comprises support members such as plate 46 and vertical member 48 for supporting the various components of tool 34. Drive mechanism 40 comprises a motor 50 which may be a one horsepower electric or air motor mounted vertically on vertical member 48 and a drive shaft 52 which is attached to motor 50 and rotatably disposed in plate 46. A first gear 54 is attached to drive shaft 52 and is capable of rotation when drive shaft 52 is rotated by motor 50. Rotation mechanism 38 comprises bearings 56 mounted on plate 46 which rotatably support gear segment 58 so that gear segment 58 may rotate relative to plate 46. Gear segment 58 is a metal member having an opening therein for accommodating cap 24 and is mounted in second gear 60 which engages first gear 54 so that when first gear 54 is rotated second gear 60 will also rotate. The rotation of second gear 60 causes gear segment 58 to also rotate. Gear segment 58 may be bolted to second gear 60 or merely inserted therein. When gear segment 58 is merely inserted in second gear 60, gear segment 58 is formed such that it is keyed into second gear 60 as shown in FIG. 4. Engagement mechanism 36 comprises inserts 62 and bar 64. Inserts 62 are mounted on gear segment 58 so as to coincide with the corners of cap 24 and extend down along the opening in gear segment 58 at least the length of cap 24. A lifting bolt 66 may be removably inserted into the top of cap 24 so that support device 44 may be easily attached to studs 22. Bar 64 may be bolted to at least two inserts 62 so as to extend along the side of lifting bolt 66. Bar 64 thus serves to prevent lifting bolt 66 from turning while studs 22 are rotated.

Referring now to FIG. 5, when caps 24 of studs 22 are of hexagonal shape as shown in FIG. 5, then inserts 62 are formed in a shape to be complementary to the corners of caps 24. In this configuration, the flat sides of caps 24 may abut the flat sides of gear segment 58 such as at location 68. However, should the flat sides of caps 24 not extend to within close proximity of the flat sides of gear segment 58, spacers 70 may be bolted to second gear 60 as shown in FIG. 4. Spacers 70 extend down the inside of gear segment 58 the length of caps 24 so that caps 24 rotate when gear segment 58 rotates.

Referring now to FIG. 6, when caps 24 have the shape as those shown in FIG. 6, no spacers 70 or jaws 62 are needed and bar 64 may be bolted to gear segment 58.

Referring again to FIGS. 2, 3, and 4, support device 44 comprises a load equalizing device 72 which may be an air cylinder with self relieving regulator such as a Smoothie Model 10100 which may be purchased from Sierra Industrial Products, Inc. Load equalizing device 72 may be suspended from an overhead crane 74 or similar device and connected to lifting bolt 66 by connecting rod 76. Load equalizing device 72 serves to apply an upward force on stud 22 equal to the weight of stud 22 so that when stud 22 is rotated into or out of closure head 14 threads 26 will not be damaged. Generally studs 22 weigh approximately 750 pounds, so the load equalizing device can be set for that weight and will thus maintain a vertical force of approximately 750 pounds on stud 22. Connecting rod 76 has a substantially conical member 78 near its lower end. When connecting rod 76 is not attached to lifting bolt 66, crane 74 can cause support device 44 to be raised which by causing conical member 78 to contact ring 80. Since ring 80 is connected to carriage 42 by struts 82, contact of conical member 78 with ring 80 can be used to support carriage 42. Therefore, crane 74 may be used to transport and align tool 34.

Carriage 42 is also equipped with handles 84 that have control triggers 86 mounted thereon. Control triggers 86 may be connected to drive mechanism 40 and to crane 74 so as to enable an operator to grasp handles 84 and to control tool 34 by manual manipulation. Wooden bumpers 88 may also be provided on carriage 42 to prevent damage to tool 34 should tool 34 be accidentally bumped against an adjacent stud 22 during removal or insertion of a stud 22.

OPERATION

When it is desired to remove closure head 14 from reactor vessel 12, a stud tensioner such as the one manufactured by Biach Industries, Inc. of Cranford, N.J., is used to loosen nut 32 and relieve the tension in stud 22. An operator then grasps handles 84 and trigger 86 while crane 74 supports the weight of tool 34 by contact of conical member 78 with ring 80. At this point the operator positions engagement mechanism 36 over cap 24 of studs 22 and crane 74 lowers the crane apparatus so that engagement mechanism 36 is in contact with cap 24 and conical member 78 is not in contact with ring 80. Lifting bolt 66 is then screwed into the top of cap 24 if it is not permanently installed therein and connecting rod 76 is attached to lifting bolt 66. The apparatus of crane 74 is caused to be raised so that an upward force is applied on lifting bolt 66 by support device 44. Support device 44 is then set to apply a constant vertical force on lifting bolt 66 that is approximately equal to the weight of stud 22 so that stud 22 and the associated threads are not damaged while stud 22 is removed. The operator then activates drive mechanism 40 by means of trigger 86 which causes motor 50 to rotate drive shaft 52 which in turn causes first gear 54 to rotate. The rotation of first gear 54 causes second gear 60 to rotate which causes gear segment 58 to rotate about bearing 56. Since inserts 62 are attached to gear segment 58 and in contact with cap 24, the rotation of gear segment 58 causes jaws 62 and cap 24 to rotate. The rotation of cap 24 which is an integral portion of stud 22 causes stud 22 to rotate out of second bore 30. As stud 22 is thus being unscrewed, support device 44 supports the weight of stud 22. When the lower end of stud 22 has been raised entirely out of second bore 30 and into first bore 28, a flat member 90 is slid into gap 92 between reactor vessel 12 and closure head 14 and stud 22 is lowered onto flat member 90 as shown in FIG. 7. Connecting rod 76 is then disconnected from lifting bolt 66 and tool 34 is removed from stud 22 and placed on another stud 22. Another crane such as crane 74 may then be attached to lifting bolt 66 to remove the stud 22 from first bore 28. As an alternative, tool 34 may also be used to lift stud 22 from first bore 28. This sequence may be continued until all studs 22 are removed from closure head 14 so that closure head 14 may be removed from reactor vessel 12. Of course, the reverse of this procedure may be utilized to insert a stud 22 into closure head 14. Therefore, the

REACTOR VESSEL STUD TURNOUT TOOL

BACKGROUND OF THE INVENTION

This invention relates to tools for removing studs from a nuclear reactor vessel and particularly to such tools utilizing automated mechanisms and weight supporting devices.

In nuclear reactors well known in the art, the reactor comprises a core of fuel assemblies having fuel elements containing nuclear fuel which produce heat in a commonly understood fashion. The core is disposed within a reactor vessel designed to contain radioactive material that has an inlet and an outlet for circulating a coolant such as water in heat transfer relationship with the fuel assemblies. A closure head is located on the top of the reactor vessel and is usually bolted thereto by a plurality of studs that extend through the closure head and into the reactor vessel so as to seal the radioactive material in the reactor vessel. The reactor coolant that has been circulated through the reactor vessel transfers the heat produced by the core to steam generating equipment for the production of heat in a conventional manner. After a period of reactor operation, the fuel assemblies in the core become depleted and must be replaced with fresh ones in a process generally referred to as refueling. During the refueling of the reactor it is necessary to remove the closure head so that the fuel assemblies of the core may be accessed. In order to remove the closure head, it is first necessary to remove the studs which hold the closure head to the reactor vessel. Of course, once the refueling operation has been completed the closure head must be again fastened to the reactor vessel by means of the studs that were removed. There are many methods known in the art for so removing these studs; however, those methods have disadvantages which render them unsatisfactory.

One method known in the art for removing the studs from a reactor vessel closure head is to manually unscrew the studs by the use of strap wrenches. When the closure head studs have thus been unscrewed a lifting bolt may be attached to the closure head stud so that an overhead crane may lift and remove the closure head studs. Once the closure head studs have been removed, an overhead crane may be utilized to lift and remove the closure head so that access may be had to the fuel assemblies in the reactor core. After the refueling process has been completed, this process is reversed resulting in the closure head being bolted to the reactor vessel. While the process can be completed in this manner, it requires the use of several working personnel for approximately twenty hours. The length of time involved in such a process substantially delays the refueling process. Furthermore, because the working personnel must be stationed in a relatively high radiation exposure area during the stud removal and insertion process, additional personnel are needed in order to minimize the radiation exposure to any particular person.

Therefore, what is needed is an apparatus that can quickly remove or insert the reactor closure head studs without damaging them.

SUMMARY OF THE INVENTION

Apparatus for removing or inserting studs of a nuclear reactor vessel closure head so that the closure head may be removed for refueling the nuclear reactor. The apparatus comprises a carriage having an engagement mechanism, a rotation mechanism, and a drive mechanism mounted thereon. The engagement mechanism firmly contacts the stud while the rotation mechanism and drive mechanism together cause the engagement mechanism and stud to rotate. In addition, a support device is associated with the carriage for supporting the carriage while the carriage is positioned near the stud and for supporting the weight of the stud while the stud is being manipulated so that the weight of the stud does not damage the threads of the reactor vessel.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings, wherein:

DESCRIPTION OF THE PREFERRED EMBODIMENT

In order to refuel a typical light water nuclear reactor, it is first necessary to remove the reactor vessel closure head studs so that the closure head may be removed in order to access the fuel assemblies in the reactor core. The invention described herein provides apparatus for facilitating the removal or replacement of these studs.

Figure 1:
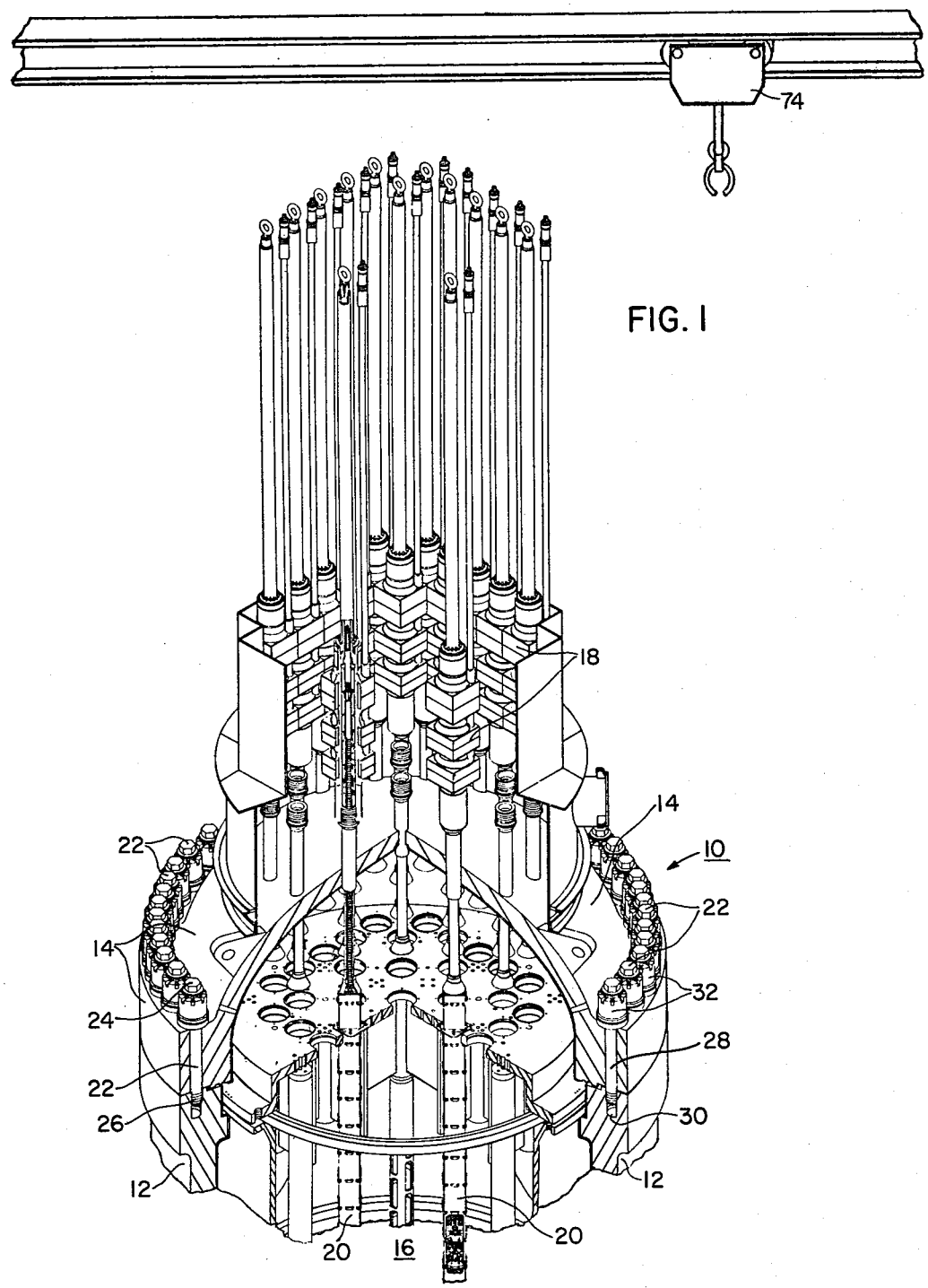
FIG. 1 is a partial cross-sectional view in perpective of a nuclear reactor.
Figure 2:
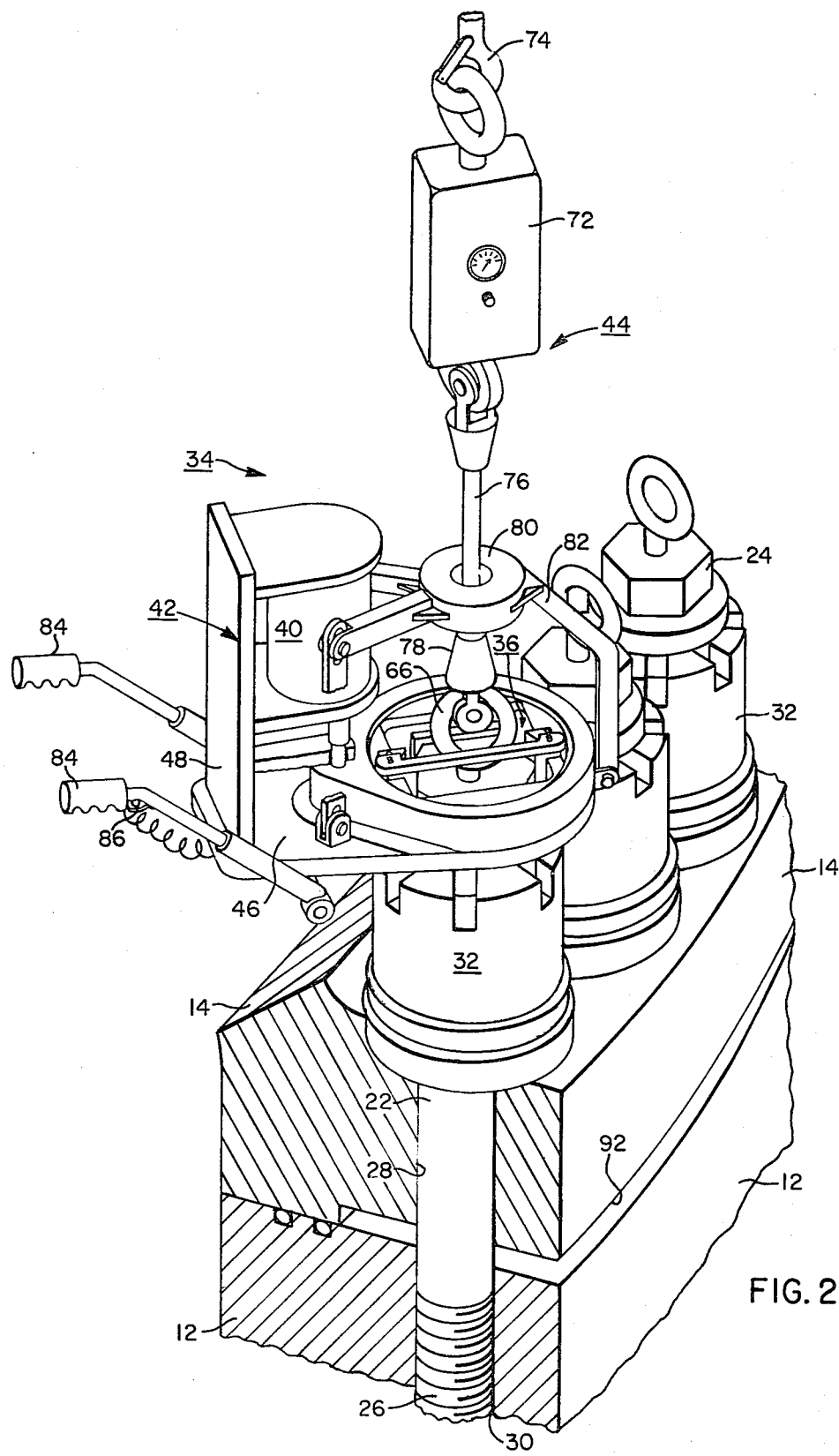
FIG. 2 is a view of the tool and closure head studs.
Figure 3:
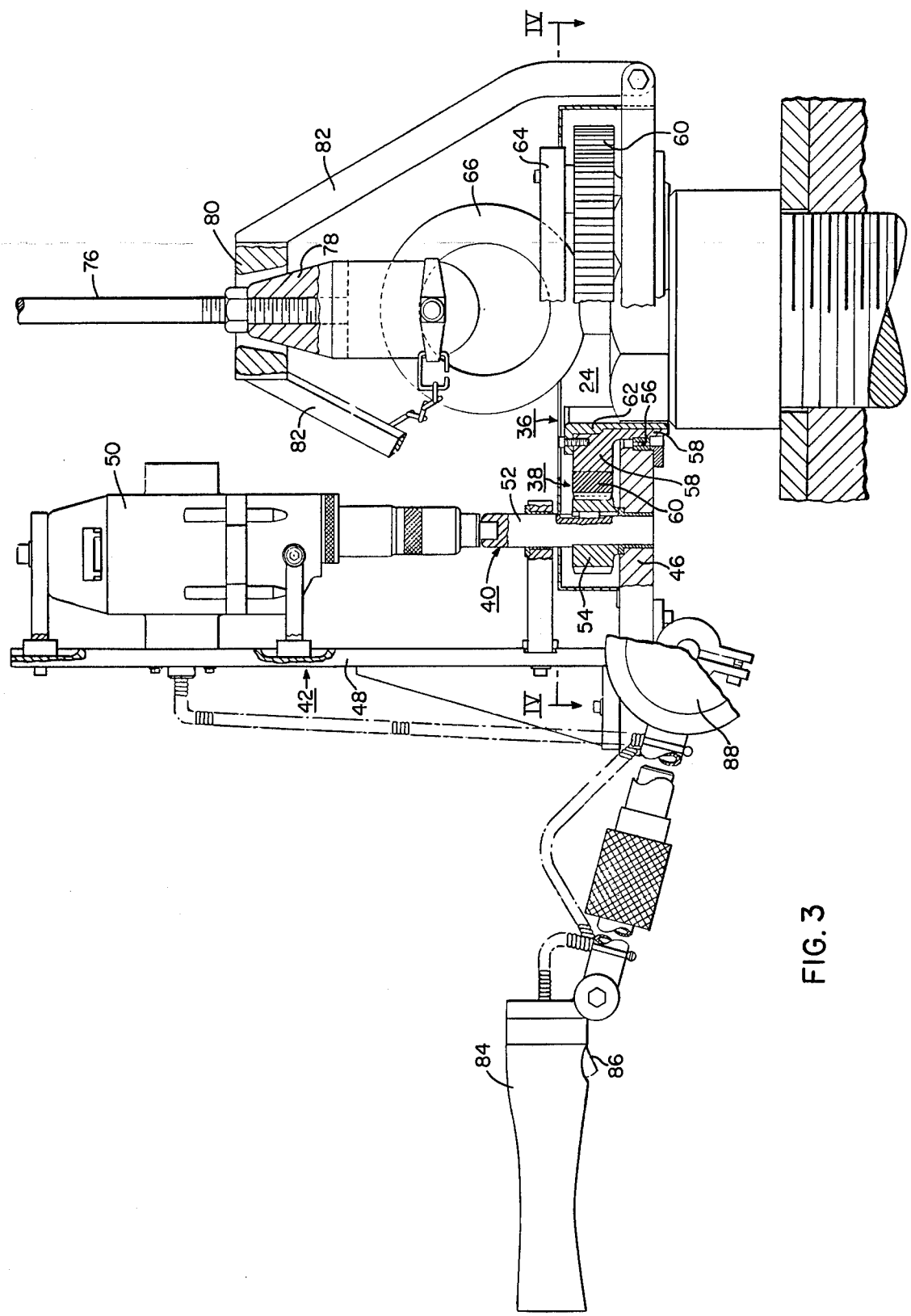
FIG. 3 is a partial cross-sectional view in elevation of the tool.
Figure 4:
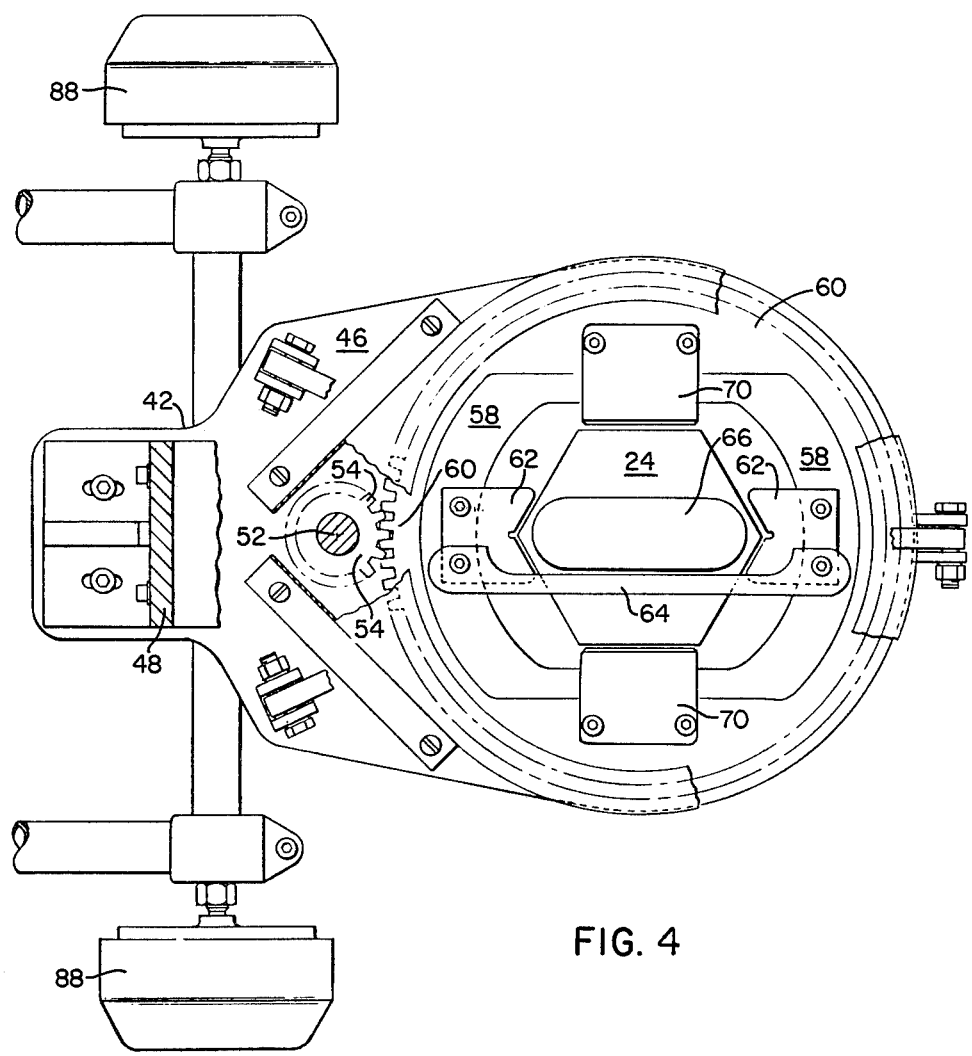
FIG. 4 is a view along line IV—IV of FIG. 3.
Figure 5:
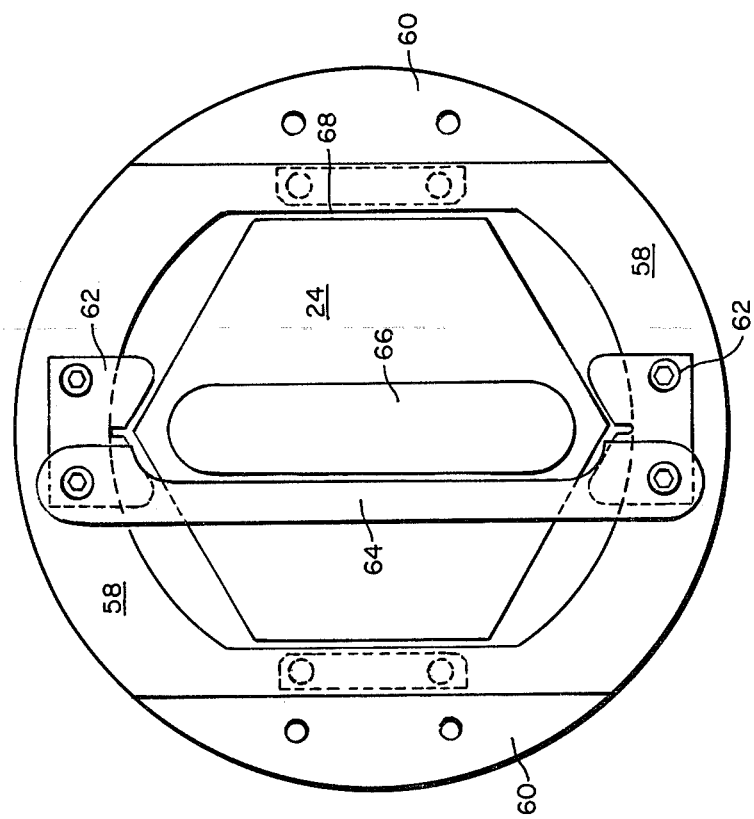
FIG. 5 is a view of the engagement mechanism.
Figure 6:
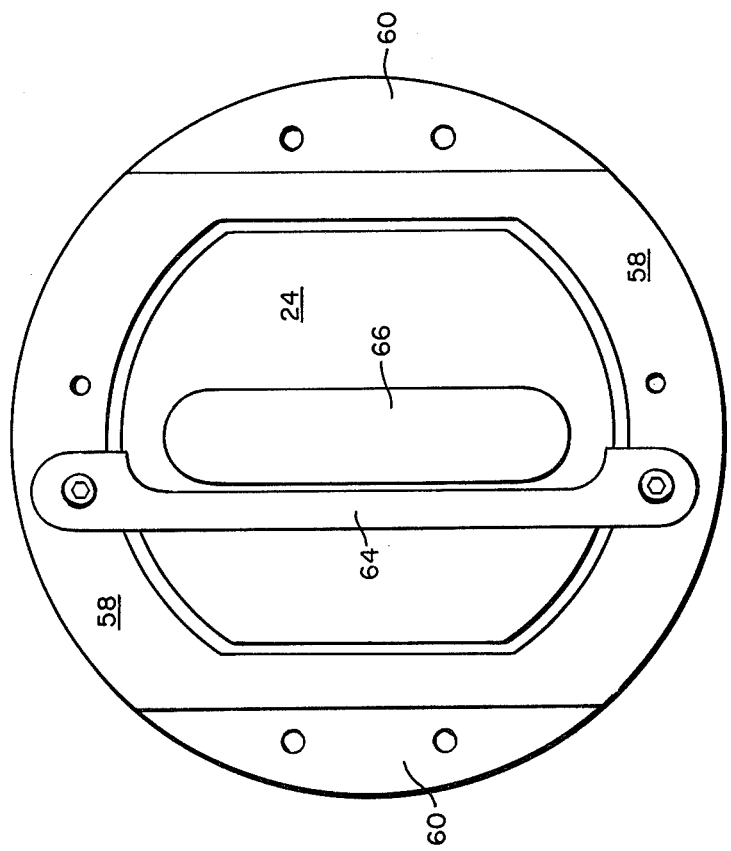
FIG. 6 is an alternative view of the engagement mechanism.
Figure 7:
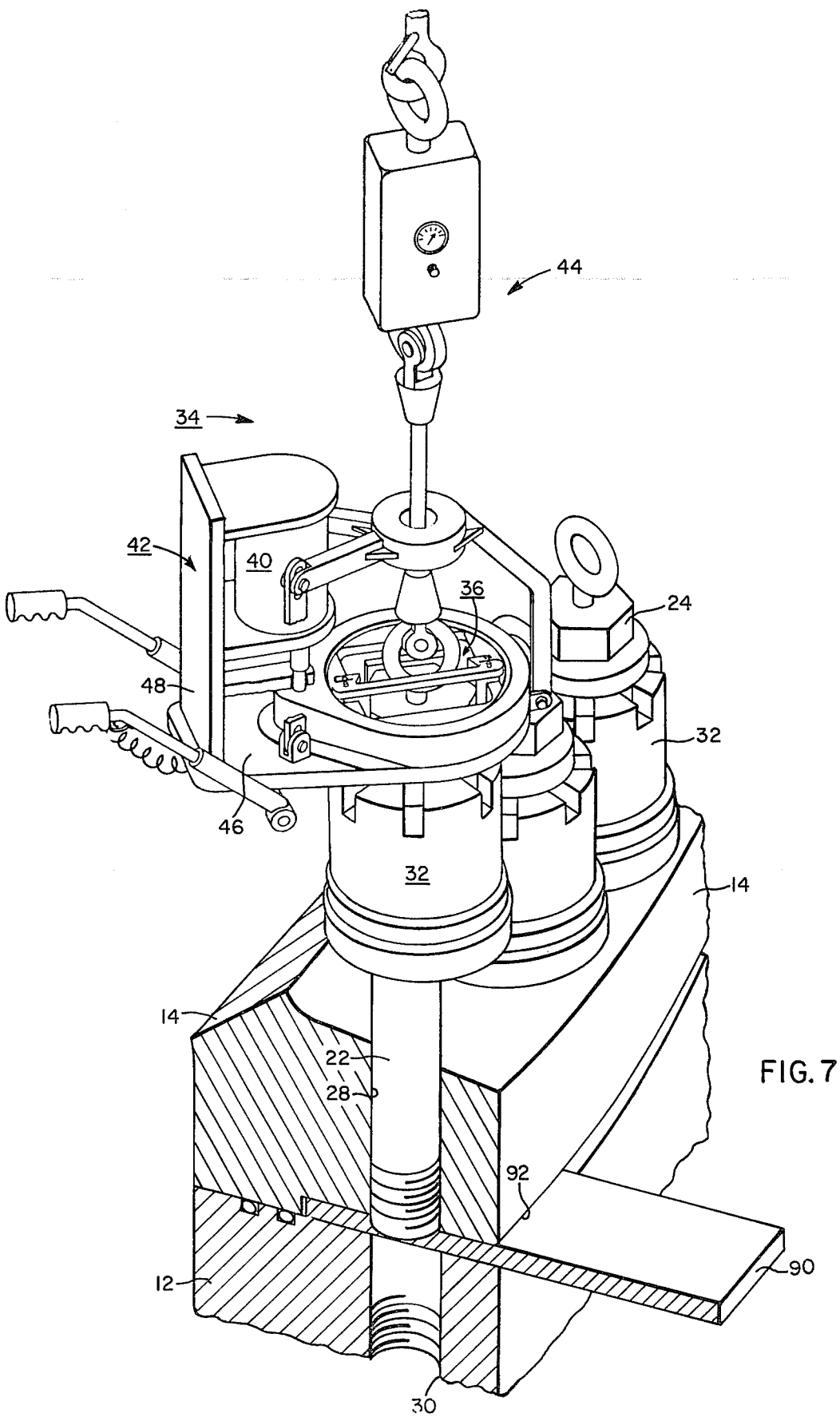
FIG. 7 is a view in elevation of the tool with a stud removed.

Referring to FIG. 1, a nuclear reactor referred to generally as 10 comprises a reactor vessel 12 with a closure head 14 attached to the top thereof. A core 16 comprises fuel assemblies (not shown) that produce heat in a conventional manner. A coolant such as water is circulated through reactor vessel 12 and in heat transfer relationship with core 16 thereby heating the coolant which is then circulated through heat exchange equipment for the production of steam and electricity. Apparatus for controlling the nuclear reaction in core 16 such as control rod drive mechanisms 18 are mounted on closure head 14 and extend therethrough and into contact with control rods 20. Closure head 14 is attached to reactor vessel 12 by means of studs 22. Studs 22 have an integral cap 24 on the top thereof and threads 26 on the bottom end. Studs 22 extend through first bores 28 in closure head 14 and into second bores 30 of reactor vessel 12. First bores 28 are not threaded while second bores 30 have threads therein that are complimentary to threads 26. Nuts 32 fit on studs 22 and engage studs 22 by means of threads not shown. Studs 22 extend into second bores 30 of reactor vessel 12 and are threaded therein. Once in this position, studs 22 are stretched into position by the use of stud tensioners well known in the art such as those manufactured by Biach Industries, Inc. of Cranford, N.J. When studs 22 are stretched and nuts 32 are tightened onto studs 22, studs 22 are in a preload tension state so that when reactor vessel 12 is internally pressurized the pressurized reactor coolant is retained.

invention provides a device that is capable of inserting or removing reactor closure head studs without damaging the studs or associated apparatus.

I claim as my invention:

1. Apparatus for manipulating reactor vessel studs comprising:

a carriage;

engagement means associated with said carriage for firmly contacting said studs;

rotation means mounted on said carriage and connected to said engagement means for rotating said engagement means when said engagement means is in contact with said studs thereby manipulating said stubs;

drive means mounted on said carriage and connected to said rotation means for rotating said rotation means;

a vertical mounting member;

a load equalizing device attached to said vertical mounting member for establishing a uniform vertical force; and a swivel connecting rod attached at one end to said load equalizing device and removably attachable to said studs at the other end for transmitting a uniform vertical force from said load equalizing device to said studs for maintaining a uniform vertical force on said studs.

2. The apparatus according to claim 1 wherein said vertical mounting member is an overhead crane.

3. The apparatus according to claim 2 wherein said engagement means comprises:

inserts mounted on said rotation means having sides complimentary to the sides of said studs for firmly contacting said studs; and a bar mounted on said inserts and extending across the top of said studs and near said swivel connecting rod for preventing rotation of said swivel connecting rod with respect to said studs while said studs are being rotated.

4. The apparatus according to claim 3 wherein said drive means comprises:

a motor having a drive shaft and mounted on said carriage; and a first gear mounted on said drive shaft for rotating said rotation means under the influence of said motor.

5. The apparatus according to claim 4 wherein said rotation means comprises:

bearings mounted on said carriage;

a gear segment mounted on said bearings for supporting said engagement means; and a second gear mounted around said gear segment and engaged with said first gear for rotating said gear segment and said engagement means about said bearings under the influence of said first gear.

6. The apparatus according to claim 5 wherein said apparatus further comprises:

struts mounted on said carriage; and a ring attached to said struts with said swivel connecting rod disposed in said ring for supporting said carriage by contact of said swivel connecting rod and said ring.

7. The apparatus according to claim 6 wherein said engagement means further comprises spacers mounted on said second gear and extending along the inside of said gear segment for contacting said studs.

8. The apparatus according to claim 7 wherein said apparatus further comprises:

handles mounted on said carriage having controls mounted thereon for controlling said carriage and said motor.

9. The apparatus according to claim 8 wherein said apparatus further comprises bumpers mounted on said carriage for protecting said carriage.

* * * * *